US011236650B2

(12) United States Patent
Fukamizu et al.

(10) Patent No.: US 11,236,650 B2
(45) Date of Patent: Feb. 1, 2022

(54) OIL SUPPLY STRUCTURE OF TRANSMISSION

(71) Applicant: HONDA MOTOR CO., LTD., Tokyo (JP)

(72) Inventors: Nobutaka Fukamizu, Wako (JP); Yuto Sasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 374 days.

(21) Appl. No.: 16/287,179

(22) Filed: Feb. 27, 2019

(65) Prior Publication Data
US 2019/0284974 A1  Sep. 19, 2019

(30) Foreign Application Priority Data

Mar. 14, 2018 (JP) .............................. JP2018-047162

(51) Int. Cl.
*F01M 11/02* (2006.01)
*F16H 57/04* (2010.01)
*F16N 1/00* (2006.01)
*F16C 33/10* (2006.01)
*F16N 21/00* (2006.01)
*F16N 7/38* (2006.01)

(52) U.S. Cl.
CPC ......... *F01M 11/02* (2013.01); *F16C 33/1045* (2013.01); *F16H 57/043* (2013.01); *F16H 57/0424* (2013.01); *F16H 57/0471* (2013.01); *F16N 1/00* (2013.01); *F16N 21/00* (2013.01); *F16N 7/38* (2013.01); *F16N 2210/04* (2013.01); *F16N 2210/12* (2013.01)

(58) Field of Classification Search
CPC .... F16H 57/0424; F16H 57/043; F01M 11/02
See application file for complete search history.

(56) References Cited

U.S. PATENT DOCUMENTS

| 2,403,579 A | * | 7/1946 | Carpenter | ........... F16H 57/0482 184/6.12 |
| 3,065,822 A | * | 11/1962 | McAfee | .................. B60R 17/00 184/6.12 |
| 4,920,825 A | * | 5/1990 | Okazaki | ................ F02F 7/0046 123/195 C |
| 4,922,765 A | * | 5/1990 | Hayakawa | ........... B60K 17/344 184/6.12 |

(Continued)

FOREIGN PATENT DOCUMENTS

| JP | 7-54972 A | 2/1995 |
| JP | 2013-113305 A | 6/2013 |

OTHER PUBLICATIONS

Office Action dated Jan. 31, 2020, issued in counterpart JP application No. 2018-047162, with partial English translation. (3 pages).

*Primary Examiner* — Minh Truong
(74) *Attorney, Agent, or Firm* — Westerman, Hattori, Daniels & Adrian, LLP

(57) ABSTRACT

An oil supply structure which supplies lubricating oil to a portion to be lubricated in a casing, the oil supply structure comprises an opening portion provided on a wall portion of the casing which corresponds to a shaft end portion of a rotary shaft supported by a bearing in the casing, and an oil passage configured to provide communication from the opening portion to at least the bearing.

6 Claims, 4 Drawing Sheets

(56) References Cited

U.S. PATENT DOCUMENTS

| | | | | |
|---|---|---|---|---|
| 5,152,190 A | * | 10/1992 | Jurgens | F16H 41/30 475/59 |
| 5,456,129 A | | 10/1995 | Tane et al. | |
| 6,484,607 B2 | * | 11/2002 | Shichinohe | F16H 45/02 192/3.31 |
| 7,174,996 B2 | * | 2/2007 | Hori | F16H 57/043 180/292 |
| 2007/0017873 A1 | * | 1/2007 | Jurado | F16H 57/043 210/695 |

* cited by examiner

SECTION ii-ii

SECTION iii-iii

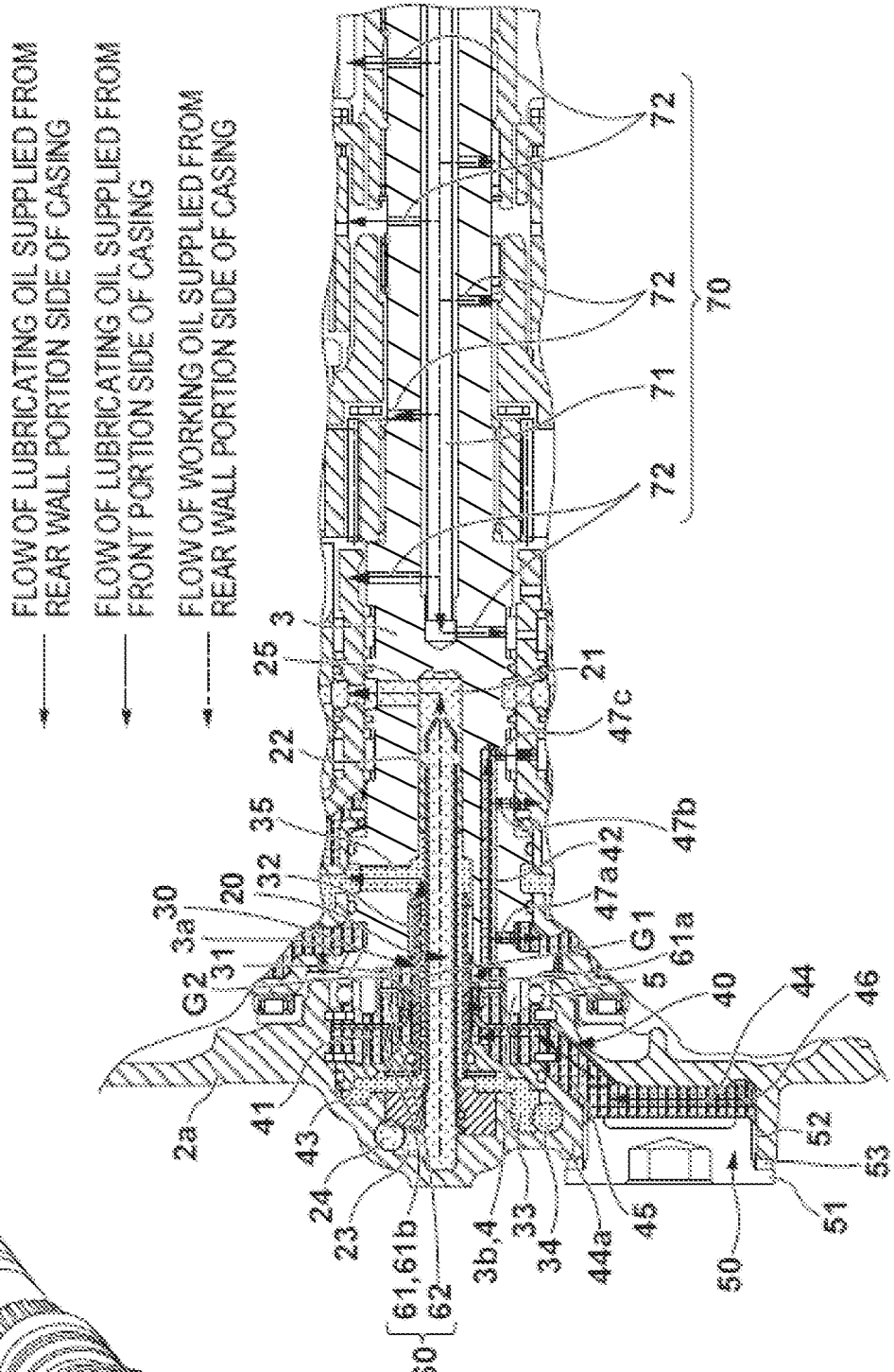

OIL SUPPLY STRUCTURE OF TRANSMISSION

CROSS-REFERENCE TO RELATED APPLICATION(S)

This application claims priority to and the benefit of Japanese Patent Application No. 2018-047162 filed on Mar. 14, 2018, the entire disclosure of which is incorporated herein by reference.

BACKGROUND OF THE INVENTION

Field of the Invention

The present invention relates to an oil supply structure in a casing of an automatic transmission or the like.

Description of the Related Art

An automatic transmission has a structure where an in-shaft oil passage is formed in a rotary shaft so as to extend in the axial direction of the rotary shaft, a through passage is formed on the in-shaft oil passage in a penetrating manner in the radial direction, lubricating oil is supplied to respective parts in a casing from the in-shaft oil passage and the through passage, and the lubricating oil is supplied only from the casing opening side (front portion side) of the in-shaft oil passage formed in the rotary shaft. In such a structure, the upstream side along the in-shaft oil passage, through which lubricating oil flows, has the maximum amount of lubrication, and the amount of lubrication reduces as the in-shaft oil passage extends to the downstream side (Japanese Patent Laid-Open No. 7-54972). Further, the oil passage is formed in the casing of the automatic transmission by applying mechanical processing in a state where a tool is inserted from the casing opening side.

In a conventional structure, the distance of the in-shaft oil passage from the upstream side to the downstream side is long. Further, a centrifugal force acts particularly during high speed rotation. Accordingly, the front portion side of the casing has a problem that friction is increased due to an excessive amount of lubrication. On the other hand, the rear wall portion side of the casing, which is the downstream side along the oil passage, has a problem that seizure occurs due to the insufficient amount of lubrication. It may be possible to adopt a structure where a plurality of through passages are provided, and diameters of holes are changed between the upstream side and the downstream side so as to adjust the amount of lubrication. However, restrictions are imposed on processing due to a reason that holes are desired to have the same diameter, or a reason that holes are not allowed to reduce a diameter. For this reason, it is difficult to adjust the amount of lubrication.

SUMMARY OF THE INVENTION

The present invention has been made in consideration of the aforementioned problems, and realizes an oil supply structure where the length of an oil passage is reduced so that lubrication performance can be stabilized.

In order to solve the aforementioned problems, the first aspect of the present invention provides an oil supply structure which supplies lubricating oil to a portion to be lubricated in a casing, the oil supply structure including: an opening portion provided on a wall portion of the casing which corresponds to a shaft end portion of a rotary shaft supported by a bearing in the casing; and an oil passage configured to provide communication from the opening portion to at least the bearing.

According to the present invention, it is possible to realize an oil supply structure where the length of an oil passage is reduced so that lubrication performance can be stabilized.

Other features and advantages besides those discussed above shall be apparent to those skilled in the art from the description of an embodiment of the invention as follows. In the description, reference is made to accompanying drawings, which form apart thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 4A is an external appearance view of a rotary shaft provided in the casing of the automatic transmission shown in FIG. 1; and FIG. 4B is a partial cross-sectional view which corresponds to FIG. 1 showing lubricating oil supply paths in this embodiment.

DESCRIPTION OF THE EMBODIMENT

Hereinafter, an embodiment recording to the present invention is described with reference to attached drawing.

Figure 1:
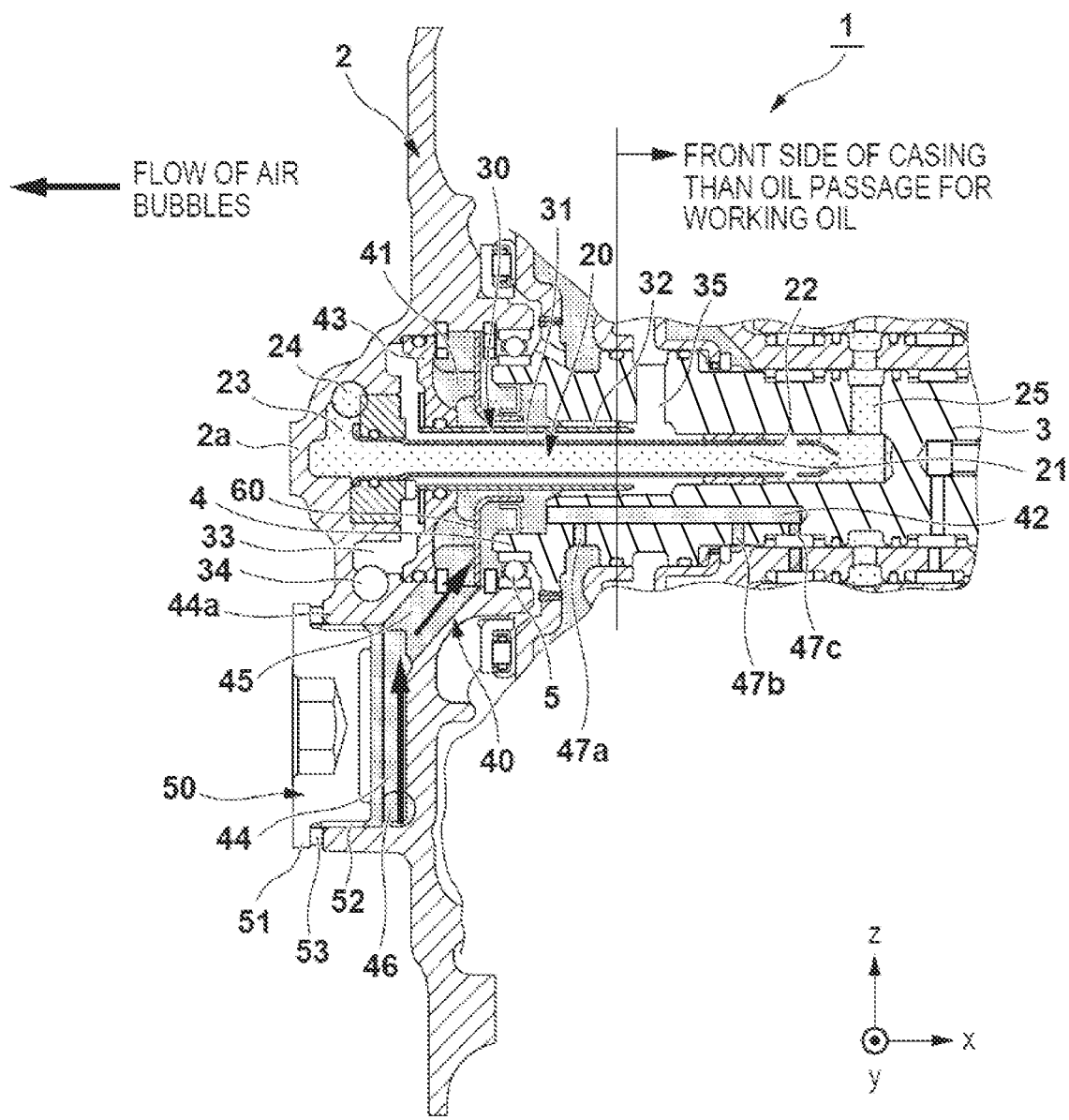
FIG. 1 is a partial cross-sectional view of an area in the vicinity of a rear wall portion of a casing of an automatic transmission which includes an oil supply structure of this embodiment.
Figure 2B:
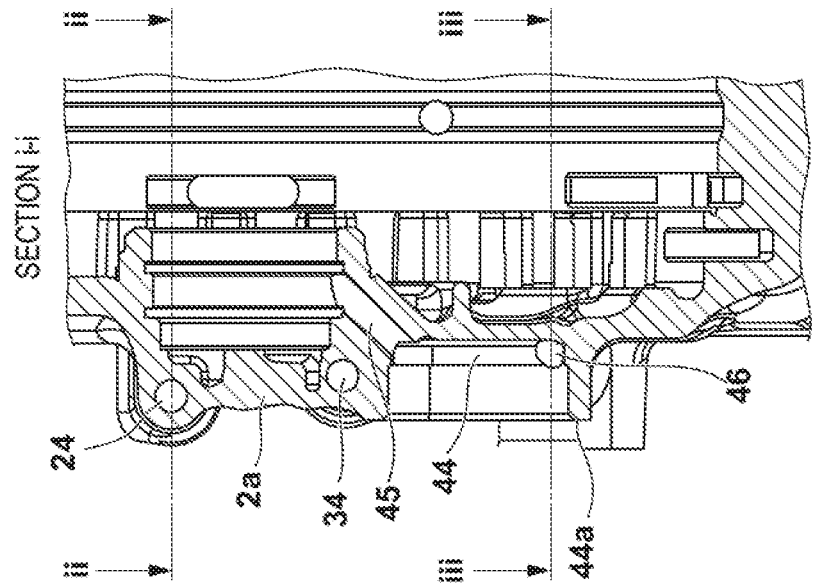
FIG. 2B is a cross-sectional view taken along line i-i in FIG. 2A.
Figure 2A:
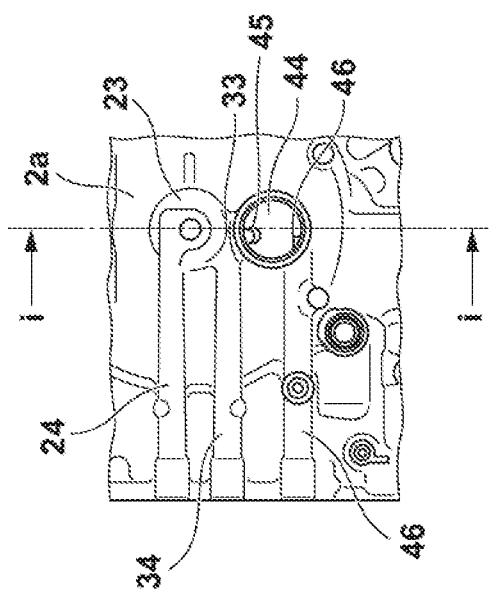
FIG. 2A is a view of a part of the rear wall portion of the casing of the automatic transmission which includes the oil supply structure of this embodiment as viewed from the back side.
Figure 3A:
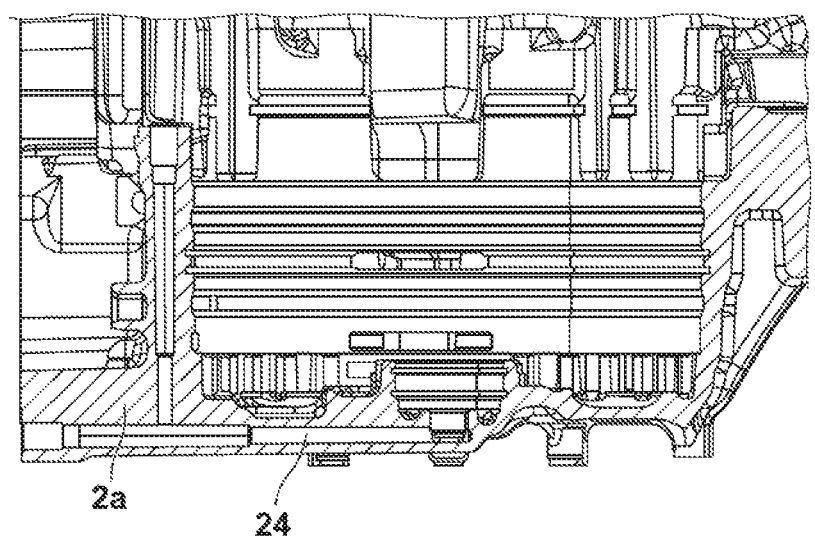
FIG. 3A is a cross-sectional view taken along line ii-ii in FIG. 2B.
Figure 3B:
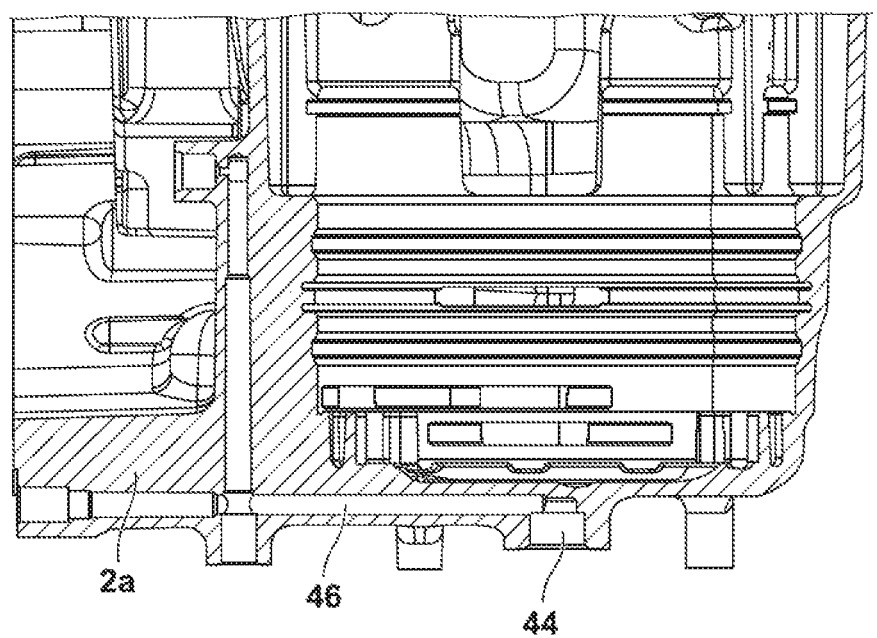
FIG. 3B is a cross-sectional view taken along line iii-iii in FIG. 2B.

FIG. 1 is a partial cross-sectional view of an area in the vicinity of a rear wall portion of a casing of an automate transmission which includes an oil supply structure of this embodiment. FIG. 2A is a view of a part of the rear wall portion of the casing of the automatic transmission which includes the oil supply structure of this embodiment as viewed rearward. FIG. 2B is a cross-sectional view taken along line i-i in FIG. 2A. FIG. 3A is a cross-sectional view taken along line ii-ii in FIG. 2B. FIG. 3B is a cross-sectional view taken along line iii-iii in FIG. 2B.

Hereinafter, an oil supply structure 1 of a transmission of this embodiment is described with reference to FIG. 1 to FIGS. 3A and 3B.

The oil supply structure 1 of the transmission of this embodiment is used in a casing of an automatic transmission of an automobile, for example, and supplies lubricating oil to parts to be lubricated in the casing. The automatic transmission of this embodiment can change a gear ratio for any often gears for forward travel and one gear for reverse travel, for example. The portion to be lubricated may be a clutch mechanism, a planetary gear mechanism, a rotary shaft 3 or a bearing which supports any of these respective components in a rotatable manner, for example.

The casing 2 has a hollow box-shaped profile where one end in the axial direction is open, and the other end in the axial direction is closed. Hereinafter, the opening side of the casing 2 is referred to as "front portion side of the casing" (the right side in the x axis in FIG. 1), and the closed side of the casing is referred to as "rear wall portion side of the casing" (the left side in the x axis in FIG. 1).

In the casing 2, the rotary shaft 3 is pivotally supported in a rotatable manner, and a first oil passage 20, a second oil passage 30, and a third oil passage 40 are provided in the rotary shaft 3. The rotary shaft 3 may be an input shaft into which a driving force is inputted from a drive source, or an output shaft winch outputs a driving force obtained by changing the rotation of the input shaft. The first oil passage 20 and the second oil passage 30 are configured to be partitioned by a first pipe member 22 and a second pipe member 32 described later, which are inserted into a shaft hole formed along the axis of the rotary shaft 3 from a shaft end portion 4 of the rotary shaft 3. The first oil passage 20 and the second oil passage 30 are oil passages for supplying a working oil pressure (clutch pressure) for switching between engagement and disengagement of the clutch mechanism. The third oil passage 40 is air oil passage for supplying lubricating oil to a bearing or the like.

The first oil passage 20 includes a first in-shaft oil passage 21 formed in the rotary shaft along the axis of the rotary shaft. The first in-shaft oil passage 21 is partitioned by the first pipe member 22 having a hollow cylindrical shape in a fluid tight manner. The first in-shaft oil passage 21 is formed on the inner side of the first pipe member 22. The first in-shaft oil passage 21 is formed such that a portion of the first pipe member 22, forming one end portion (on the rear wall portion side of the casing which is on the left side in FIG. 1) of the first in-shaft oil passage 21, extends to a first shaft end oil passage 23 which is formed on a rear wall portion 2a (a side wall in a state where the transmission is disposed in an engine room) of the casing. The first in-shaft oil passage 21 intersects and communicates with a first introduction oil passage 24 which is provided on the rear wall portion 2a of the casing. A first through passage 25 is formed on the other end portion (on the inner side of the casing which is on the right side in FIG. 1) of the first in-shaft oil passage 21 in a penetrating manner in the radial direction of the rotary shaft 3.

The first introduction oil passage 24 has a circular flow passage cross section, and extends in a first direction (y direction) from one side portion (the lower side of the paper on which the drawing is made) toward a center portion (in the y direction in the drawing) of the rear wall portion 2a of the casing. The first in-shaft oil passage 21 extends in a second direction (x direction), which is a direction orthogonal to the first introduction oil passage 24, from the rear wall portion 2a of the easing toward the inside of the casing. Working oil is pressure-fed by a pump not shown in the drawing. The working oil is introduced from the first introduction oil passage 21 and passes through the first shaft end oil passage 23 and the first in-shaft oil passage 21 and, then, is applied to a piston chamber of the clutch mechanism not shown in the drawing from the first through passage 25.

The second oil passage 30 includes a second in-shaft oil passage 31 which is formed in the rotary shaft 3 so as to surround the outer side of the first in-shaft oil passage 21. The second in-shaft oil passage 31 is partitioned by the first pipe member 22 in a fluid tight manner with respect to the first in-shaft oil passage 21. The first in-shaft oil passage 21 is formed on the inner side of the first pipe member 22, and the second in-shaft oil passage 31 is provided between the first pipe member 22 and the second pipe member 32, which is disposed outside the first pipe member 22. The second in-shaft oil passage 31 is formed such that a portion of the second pipe member 32, forming one end portion (on the rear wall portion side of the casing which is on the left side in FIG. 1) of the second in-shaft oil passage 31, extends to a second shaft end oil passage 33 which is formed on the rear wall portion 2a of the casing. The second shaft end oil passage 33 intersects and communicates with a second introduction oil passage 34 which is provided on the rear wall portion 2a of the casing. A second through passage 35 is formed on the other end portion (on the inner side of the casing which is on the right side in FIG. 1) of the second in-shaft oil passage 31 in a penetrating manner in the radial direction of the rotary shaft 3.

On the rear wall portion 2a of the casing, the second introduction oil passage 34 is disposed at a position lower than the first introduction oil passage 24. The second introduction oil passage 34 has a circular flow passage cross section, and extends in the first direction (y direction) from one side portion toward the center portion of the rear wall portion 2a of the casing. The second oil passage 30 extends in the second direction (x direction), which is a direction orthogonal to the second introduction oil passage 34, from the rear wall portion 2a of the casing toward the inside of the casing 2. The second through passage 35 is disposed at a position closer to the rear wall portion 2a of the casing than the first through passage 25 of the first oil passage 20. Working oil is pressure-fed by a pump not shown in the drawing. The working oil is introduced from the second introduction oil passage 34, and passes through the second shaft end oil passage 33 and the second in-shall oil passage 31 and, then, is applied to the piston chamber of the clutch mechanism not shown in the drawing from the second through passage 35.

The third oil passage 40 includes a third shaft end oil passage 41 and a third in-shaft oil passage 42. The third shaft end oil passage 41 is formed between the rear wall portion 2a of the casing and one end portion (on tire rear wall portion side of the casing which is on the left side in FIG. 1) of the rotary shaft 3. The third in-shaft oil passage 42 is formed in the rotary shaft 3. The third in-shaft oil passage 42 is formed in the rotary shaft 3 at a position outward of the second in-shaft oil passage 31 in the radial direction. The third in-shaft oil passage 42 is not formed over the whole periphery of the rotary shaft 3 so as to surround the second in-shaft oil passage 31, but is formed so as to surround a portion of the rotary shaft 3.

The third shaft end oil passage 41 is partitioned by the second pipe member 32 in a fluid tight manner with respect to the second in-shaft oil passage 31, and is partitioned by a partition member 43 in a fluid tight manner with respect to the second shaft end oil passage 33. The third in-shaft oil passage 42 is formed in the rotary shaft 3 at a position outward of the second in-shaft oil passage 31 in the radial direction, and extends from the third shaft end oil passage 41 toward the inside of the casing (in the x direction).

The third oil passage 40 includes a third inflow oil passage 44 and a third connecting oil passage 45. The third inflow oil passage 44 is provided on the rear wall portion 2a of the casing. The third connecting oil passage 45 makes the third inflow oil passage 44 and the third shaft end oil passage 41 communicate with each other. The third inflow oil passage 44 intersects and communicates with a third introduction oil passage 46 provided on the rear wall portion 2a of the casing. The third introduction oil passage 46 has a circular flow passage cross section, and extends in the first direction (y direction) from one side portion toward the center portion of the rear wall portion 2a of the casing.

The third connecting oil passage 45 extends obliquely upward from the third inflow oil passage 44 toward the inside of the casing from the rear wall portion 2a side of the casing. The third inflow oil passage 44 has a cylindrical opening portion 44a formed on the rear wall portion 2a of the casing. The opening portion 44a is provided for processing the third connecting oil passage 45. The third connecting oil passage 45 is processed in a state where a drill or the like for drilling processing is inserted through the opening portion 44a of the third inflow oil passage 44. Thereafter, the opening portion 44a is closed by a cap 50 in a fluid tight manner. The cap 50 is formed of a flange portion 51 and a screw portion 52, and is detachably mounted on the opening portion 44a of the third inflow oil passage 44. The cap 50 is threadedly engaged with a screw portion formed on the opening portion 44a of the third inflow oil passage 44, thus being fixed to the rear wall portion 2a of the casing. Further, the cap 50 is fixed in a state where a sealing member 53 is interposed between the flange portion 51 and the rear wall portion 2a of the casing. The third shaft end oil passage 41 communicates with a bearing 5, and a portion of the third in-shaft oil passage 42 on the rear wall portion side of the casing by way of a flow rate adjusting member 60. The bearing 5 pivotally supports the shaft end portion 4 of the rotary shaft 3 in a rotatable manner. The amount and flow speed of lubricating oil which flows into the bearing 5 and the third in-shaft oil passage 42 are adjusted by the flow rate adjusting member 60. The flow rate adjusting member 60 dams lubricating oil which flows from the third shaft end oil passage 41 to the bearing 5 and the third in-shaft oil passage 42, and appropriately adjusts a flow rate of lubricating oil when the lubricating oil accumulating on the upstream side of the flow rate adjusting member 60 in the third shaft end oil passage 41 flows to the downstream side of the flow rate adjusting member 60.

One end portion (on the rear wall portion side of the casing winch is on the left side in FIG. 1) of the third in-shaft oil passage 42 is connected to the third shaft end oil passage 41. A plurality of third through passages 47a, 47b, 47c are formed on the third in-shaft oil passage 42 in a penetrating manner in the radial direction of the rotary shaft 3. Lubricating oil is pressure-fed by a pump not shown in the drawing. The lubricating oil is introduced from the third introduction oil passage 46, and passes through the third inflow oil passage 44, the third connecting oil passage 45, the third shaft end oil passage 41, and the third in-shaft oil passage 42. Then, the lubricating oil flows out to an area around the rotary shaft 3 from the third through passage 47a, 47b, 47c, thus being supplied to parts to be lubricated in the casing.

The third introduction oil passage 46 and the cap 50 are disposed at positions lower than the first introduction oil passage 24 and the second introduction oil passage 34 on the rear wall portion 2a of the casing. Further, the third inflow oil passage 44, the third connecting oil passage 45 and the third shaft end oil passage 41 has substantially the same flow passage cross-sectional area. Causing these oil passages to have substantially the same cross-sectional area in this manner allows these oil passages to have uniform flow rate and flow speed. Accordingly, the generation of air bubbles can be suppressed and hence, parts to be lubricated can be stably lubricated. Further, the third inflow oil passage 44 and the cap 50 are disposed at positions lower than the third connecting oil passage 45 and the third shaft end oil passage 41. Accordingly, it is possible to prevent air bubbles, mixed into lubricating oil, from stagnating in a lauding formed of the third inflow oil passage 44, thus realizing the structure which allows air bubbles to easily rise and escape.

As described above, according to this embodiment, the third oil passage 40 has the opening portion 44a provided on the rear wall portion 2a of the casing 2 which corresponds to the shaft end portion 4 of the rotary shaft 3 supported by the bearing 5 in the casing 2. The third oil passage 40 includes the third inflow oil passage 44 and the third connecting oil passage 45 so as to provide communication from the opening portion 44a to at least the bearing 5. The third connecting oil passage 45 extends obliquely upward from the third inflow oil passage 44 toward the bearing 5. With such a configuration, in the same manner as working oil to be supplied to the first oil passage 20 and the second oil passage 30, lubricating oil to be introduced into the third oil passage 40 can also be supplied from the third introduction oil passage 46 formed on the rear wall portion 2a of the casing. Further, it is possible to reduce the length of the oil passage from the third inflow oil passage 44, formed on the rear wall portion 2a of the casing, to the third m-shaft oil passage 42, and stagnation of air bubbles in the oil passage can be prevented and hence, lubrication performance can be stabilized. Particularly in an automatic transmission or the like with ten gears for forward travel where a clutch mechanism and a planetary gear mechanism are laid out up to the rear wall portion 2a of the casing, it becomes possible to supply the sufficient amount of lubricating oil from the rear wall portion 2a of the casing 2. Accordingly, it becomes possible to supply the sufficient amount of lubricating oil to corners of a narrow space in the casing 2.

Further, in the rotary shaft 3, the first in-shaft oil passage 21 and the second in-shaft oil passage 31 are configured to be partitioned by the first and second pipe members 22, 32 such that the first in-shaft oil passage 21 and the second in-shaft oil passage 31 overlap with each other in the radial direction. The third in-shaft oil passage 42 extends parallel to the axis of the rotary shaft 3. Accordingly, it is possible to form the third through passages 47b, 47c of the third oil passage 40 at positions more on the front portion side of the casing than the oil passage (the second through passage 35 of the second oil passage 30) through which working oil is to be introduced into the rotary shaft 3. That is, a large amount of working oil is required to be supplied to a piston chamber during high speed rotation and hence, in a conventional configuration where lubricating oil is supplied only from the front portion side of the casing (a fourth oil passage 70 in FIG. 4B described later), there is a problem that the sufficient amount of lubricating oil is not supplied to the rear wall portion side of the casing. However, in the oil supply structure of tins embodiment, the sufficient amount of lubricating oil can be supplied also from the rear wall portion side of the casing during high speed rotation and hence, it becomes possible to supply the sufficient amount of lubricating oil to the entire space in the casing 2 ranging from the front side to the rear wall portion side. In addition to during high speed rotation, substantially the same lubrication performance can be acquired also in the case where a high load is applied.

<Flow Rate Adjusting Member>

Next, the flow rate adjusting member, which the oil supply structure of this embodiment includes, is described with reference to FIGS. 4A and 4B.

FIG. 4A is an external appearance view of the rotary shaft provided in the casing of the automatic transmission shown in FIG. 1. FIG. 4B is a partial cross-sectional view which corresponds to FIG. 1 showing lubricating oil supply paths in this embodiment. In FIGS. 4A and 4B, components substantially equal to the corresponding components in FIG. 1 are given the same reference numerals.

As shown in FIGS. 4A and 4B, an enlarged-diameter portion 3a and a cylindrical protruding portion 3b are provided on a portion of the outer peripheral surface of the rotary shaft 3 on the rear wall portion side of the casing. The enlarged-diameter portion 3a expands outward in the radial direction. The protruding portion 3b protrudes to the rear wall portion side of the casing from the enlarged-diameter portion 3a.

The enlarged-diameter portion 3a forms the side wall portion of the third shaft end oil passage 41 on the front portion side of the casing. The protruding portion 3b protrudes from the enlarged-diameter portion 3a toward the third shaft end oil passage 41.

The flow late adjusting member 60 includes a first guide member 61 having an L shape in cross section and a second guide member 62 having a U shape in cross section. The first guide member 61 includes a cylindrical portion 61a, and a disk portion 61b which expands outward in the radial direction from a portion of the cylindrical portion 61a on the rear wall portion side of the casing. The cylindrical portion 61a is disposed at a position close to a portion of the outer peripheral surface of the rotary shaft 3, which corresponds to tire second in-shaft oil passage 31, with a first gap G1 formed therebetween. The outer peripheral edge portion of the disk portion 61b is fixed to a portion of the wall portion of the third shaft end oil passage 41 by a fastening member, such as a circlip.

The second guide member 62 has a ring-shaped outer profile having a recessed portion which extends in the circumferential direction. The outer peripheral surface of the second guide member 62 is mounted on the inner peripheral surface of the protruding portion 3b formed at the shaft end portion 4 of the rotary shaft 3. The inner peripheral surface of the second guide member 62 is disposed close to the outer peripheral surface of the cylindrical portion 61a of the first guide member 61 with a second gap G2 formed therebetween.

The bearing 5 supports the shaft end portion 4 of the rotary shaft 3. The bearing 5 is disposed in a space partitioned by the first guide member 61 and the second guide member 62 in the third shaft end oil passage 41 at a position more on the front portion side of the casing than the first guide member 61.

The flow rate adjusting member 60 having such a configuration dams lubricating oil which flows from the third connecting oil passage 45 into the third shaft end oil passage 41. The first gap G1 acts as an orifice, thus appropriately adjusting a flow rate of lubricating oil when the lubricating oil accumulating on the upstream side of the flow rate adjusting member 60 in the third shaft end oil passage 41 flows to the downstream side of the flow rate adjusting member 60. The lubricating oil which flows to the downstream side of the flow rate adjusting member 60 in the third shaft end oil passage 41 is introduced into the third in-shaft oil passage 42. At the same time, the second gap G2 acts as an orifice, thus appropriately adjusting lubricating oil to be introduced into the bearing 5. The lubricating oil introduced into the third in-shaft oil passage 42 is supplied to parts to be lubricated in the casing 2 from the third through passages 47a to 47c.

On the other hand, the fourth oil passage 70, which extends from the front portion side of the casing to the tear wall portion side of the casing, is provided on the rotary shaft 3. The fourth oil passage 70 includes a fourth in-shaft oil passage 71 formed in the rotary shaft 3 along the axis of the rotary shaft 3. The portion of the fourth in-shaft oil passage 71 on the rear wall portion side of the casing extends to an area in the vicinity of the portion of the first oil passage 20 on the front portion side of the casing. Further, a plurality of fourth through passages 72 are formed on the fourth in-shaft oil passage 71 in a penetrating manner in the radial direction of the rotary shaft 3.

In the fourth oil passage 70, lubricating oil is supplied to the fourth in-shaft oil passage 71 from the front portion side of the casing. The lubricating oil is supplied to parts to be lubricated in the casing 2 from the fourth in-shaft oil passage 71 through the fourth through passage 72.

As described above, according to the oil supply structure of this embodiment, lubricating oil is dammed by the flow rate adjusting member 60, and is fed after being adjusted to an appropriate flow rate by the first gap G1. Accordingly, lubricating oil can be efficiently supplied to the bearing 5 and the third in-shaft oil passage 42 disposed on the downstream side of the flow rate adjusting member 60. Further, it becomes possible to easily adjust the amount of lubricating oil to be supplied to parts to be lubricated from the third through passages 47a to 47c through the third m-shaft oil passage 42 of the third oil passage 40.

Further, the oil passages can be disposed between the front portion side and the rear wall portion side in the casing 2 in a well-balanced manner.

Accordingly, the sufficient amount of lubricating oil can be supplied to the entire space in the casing 2.

The above-mentioned embodiment merely constitutes an example of implementing the present invention. The present invention is also applicable to an embodiment that variations or modifications are employed without departing from the gist of the present invention.

The oil supply structure 1 of this embodiment is not limited to an automatic transmission, and is applicable to any of various mechanisms which require supply of lubricating oil.

Summary of Embodiment

First Aspect

The oil supply structure 1 supplies lubricating oil to the part to be lubricated 3, 4 in the casing 2. The oil supply structure 1 includes:

the opening portion 44a provided on the wall portion 2a of the casing 2 which corresponds to the shaft end portion 4 of the rotary shaft 3 supported by the bearing 5 in the casing 2; and the oil passage 40 configured to provide communication from the opening portion 44a to at least the bearing 5.

According to the first aspect, the length of the oil passage 40 can be reduced, and stagnation of air bubbles in the oil passage 40 can be prevented and hence, lubrication performance can be stabilized. Further, the oil passage 40 can be formed in a narrow space in the casing 2 and hence, it becomes possible to supply the sufficient amount of lubricating oil to corners of the space in the casing 2.

Second Aspect

In the first aspect, the oil passage 40 includes the inflow oil passage 44 which communicates with the opening portion 44a, and the connecting oil passage 45 which extends obliquely upward from the inflow oil passage 44 toward the bearing 5, and the opening portion 44a is closed by the cap 50.

According to the second aspect, the connecting oil passage 45 can be processed by inserting a drill or the like for drilling processing from the opening portion 44a of the inflow oil passage 44. Accordingly, it is possible to easily form the oil passage 40 in a narrow space in the casing 2.

Third Aspect

In the second aspect, the oil simply structure includes the first oil passage 20, the second oil passage 30, and the third oil passage 40, and the third oil passage 40 includes the inflow oil passage 44 and the connecting oil passage 45.

According to the third aspect, the length of the third oil passage 40 can be reduced, and stagnation of air bubbles in the oil passage can be prevented and hence, lubrication performance can be stabilized.

Fourth Aspect

In the third aspect, the first oil passage 20 communicates with the first introduction oil passage 24, which is provided on the wall portion 2a of the casing 2, and through which lubricating oil is to be introduced into the casing 2, the first oil passage 20 supplying lubricating oil into the casing 2 from the inside of the rotary shaft 3, the second oil passage 30 communicates with the second introduction oil passage 34, which is provided on the wall portion 2a of the casing 2, and through which lubricating oil is to be introduced into the casing 2, the second oil passage 30 supplying lubricating oil into the casing 2 from the inside of the rotary shaft 3, and the third oil passage 40 communicates with the third introduction oil passage 46, which is provided on the wall portion 2a of the casing 2, and through which lubricating oil is to be introduced into the casing 2, the third oil passage 40 supplying lubricating oil into the casing 2 from the inside of the rotary shaft 3 through the third introduction oil passage 46, the inflow oil passage 44, and the connecting oil passage 45.

According to the fourth aspect, in a configuration where parts to be lubricated are laid out up to the wall portion 2a of the casing 2, it becomes possible to supply the sufficient amount of lubricating oil from the wall portion 2a of the casing 2.

Fifth Aspect

In the fourth aspect, the first oil passage 20 communicates with the first introduction oil passage 24 so as to intersect on the wall portion 2a of the casing 2.

the second oil passage 30 communicates with the second introduction oil passage 34 so as to intersect on the wall portion 2a of the casing 2, and the inflow oil passage 44 is provided at a position where the third oil passage 40 and the third introduction oil passage 46 intersect with each other.

According to the fifth aspect, in a configuration where parts to be lubricated are laid out up to the wall portion 2a of the casing 2, it becomes possible to supply the sufficient amount of lubricating oil from the wall portion 2a of the casing 2.

Sixth Aspect

In the fifth aspect, the third oil passage 40 includes the third shaft end oil passage 41 and the third in-shaft oil passage 42, the third shaft end oil passage 41 communicating with the connecting oil passage 45, and being provided on the shaft end side of the rotary shaft 3, and the third in-shaft oil passage 42 being provided in the rotary shaft 3, and extending in the axial direction from the third shaft end oil passage 41, and the third shaft end oil passage 41 communicates with the bearing 5.

According to the sixth aspect, it becomes possible to supply the sufficient amount of lubricating oil to the bearing 5, which supports the rotary shaft 3, when lubricating oil is introduced into the rotary shaft 3 from the connecting oil passage 45.

Seventh Aspect

In the sixth aspect, the inflow oil passage 44 and the connecting oil passage 45 are formed to have a substantially equal flow passage area.

According to the seventh aspect, causing the oil passages to have substantially the same cross-sectional area allows the oil passages to have uniform flow rate and flow speed. Accordingly, the generation of air bubbles can be suppressed and hence, parts to be lubricated can be stably lubricated.

Eighth Aspect

In the seventh aspect, the third introduction oil passage 46 is disposed at a position lower than the first introduction oil passage 24 and the second introduction oil passage 34, and the inflow oil passage 44 is disposed at a position lower than the connecting oil passage 45.

According to the eighth aspect, it is possible to prevent air bubbles, mixed into lubricating oil, from stagnating in a lauding formed of the inflow oil passage 44, thus realizing the structure which allows air bubbles to easily rise and escape.

Ninth Aspect

In any one of the sixth to eighth aspects, the first oil passage 20 and the second oil passage 30 are configured to be partitioned by the first pipe member 22 and the second pipe member 32, which are inserted into the shaft hole 21 formed along the axis of the rotary shaft 3 from the shaft end portion 4 of the rotary shaft 3, and the second oil passage 30 is provided so as to surround the outer side of the first oil passage 20 by the first pipe member 22, the third shaft end oil passage 41 is provided so as to surround an outer side of the second oil passage 30 by the second pipe member 32, and the third in-shaft oil passage 42 communicates with the third shaft end oil passage 41, and is provided in the rotary shaft 3 at a position outward of the first oil passage 20 and the second oil passage 30 in the radial direction.

According to the ninth aspect, in the rotary shaft 3, the first oil passage 20 and the second oil passage 30 are configured to be partitioned by the first and second pipe members 22, 32, and the third oil passage 40 extends parallel to the axis of the rotary shaft 3. Accordingly, it is possible to form the third oil passage 40 (the third through passages 47b, 47c of the third oil passage 40) al a position more on the front portion side of the casing than the second oil passage 30 (the second through passage 35 of the second oil passage 30) through which working oil is to be introduced into the rotary shaft 3. That is, a large amount of working oil is required to be supplied to a piston chamber during high speed rotation and hence, in a conventional configuration where lubricating oil is supplied only from the front portion side of the casing, there is a problem that the sufficient amount of lubricating oil is not supplied to the rear wall portion side of the casing.

However, according to the configuration of the present invention, the sufficient amount of lubricating oil can be supplied also from the rear wall portion side of the casing during high speed rotation and hence, it becomes possible to supply the sufficient amount of lubricating oil to the entire space in the casing 2 ranging from the front side to the rear wall portion side.

Tenth Aspect

In any one of the second to ninth aspects, the opening portion 44a is provided for processing the connecting oil passage 45 in the casing 2.

According to the tenth aspect, the oil passage can be easily processed by inserting a drill or the like for drilling processing into the opening portion 44a from the outside of the wall portion 2a of the casing 2.

What is claimed is:

1. An oil supply structure which supplies lubricating oil to a portion to be lubricated in a casing, the oil supply structure comprising:

an opening portion provided on a wall portion of the casing which corresponds to a shaft end portion of a rotary shaft supported by a bearing in the casing; and an oil passage configured to provide communication from the opening portion to at least the bearing, wherein the oil passage includes an inflow oil passage which communicates with the opening portion, and a connecting oil passage which extends obliquely upward from the inflow oil passage toward the bearing, and the opening portion is closed by a cap, the oil supply structure comprises a first oil passage; a second oil passage; and a third oil passage, the third oil passage includes the inflow oil passage and the connecting oil passage, the first oil passage communicates with a first introduction oil passage, which is provided on the wall portion of the casing, and through which lubricating oil is to be introduced into the casing, the first oil passage supplying lubricating oil into the casing from an inside of the rotary shaft, the second oil passage communicates with a second introduction oil passage, which is provided on the wall portion of the casing, and through which lubricating oil is to be introduced into the casing, the second oil passage supplying lubricating oil into the casing from the inside of the rotary shaft, and the third oil passage communicates with a third introduction oil passage, which is provided on the wall portion of the casing, and through which lubricating oil is to be introduced into the casing, the third oil passage supplying lubricating oil into the casing from the inside of the rotary shaft through the third introduction oil passage, the inflow oil passage, and the connecting oil passage, the third introduction oil passage is disposed at a position lower than the first introduction oil passage and the second introduction oil passage, and the inflow oil passage is disposed at a position lower than the connecting oil passage, wherein the inflow oil passage and the connecting oil passage are formed to have a substantially equal flow passage area.

2. The oil supply structure according to claim 1, wherein the first oil passage communicates with the first introduction oil passage so as to intersect on the wall portion of the casing, the second oil passage communicates with the second introduction oil passage so as to intersect on the wall portion of the casing, and the inflow oil passage is provided at a position where the third oil passage and the third introduction oil passage intersect with each other.

3. The oil supply structure according to claim 1, wherein the third oil passage includes a third shaft end oil passage and a third in-shaft oil passage, the third shaft end oil passage communicating with the connecting oil passage, and being provided on a shaft end side of the rotary shaft, and the third in-shaft oil passage being provided in the rotary shaft, and extending in an axial direction from the third shaft end oil passage, and the third shaft end oil passage communicates with the bearing.

4. The oil supply structure according to claim 3, wherein the first oil passage and the second oil passage are configured to be partitioned by a first pipe member and a second pipe member, which are inserted into a shaft hole formed along an axis of the rotary shaft from a shaft end portion of the rotary shaft, the second oil passage is provided so as to surround an outer side of the first oil passage by the first pipe member, the third shaft end oil passage is provided so as to surround an outer side of the second oil passage by the second pipe member, and the third in-shaft oil passage communicates with the third shaft end oil passage, and is provided in the rotary shaft at a position outward of the first oil passage and the second oil passage in a radial direction.

5. The oil supply structure according to claim 1, wherein the opening portion is provided for processing the connecting oil passage in the casing.

6. The oil supply structure according to claim 1, wherein the cap is detachably mounted on the opening portion.

* * * * *